United States Patent [19]

Morse

[11] 4,077,737
[45] Mar. 7, 1978

[54] INTEGRAL HOLE SAW AND ARBOR CONSTRUCTION

[76] Inventor: Mansfield K. Morse, 1916 Frazer Ave. NW., Canton, Ohio 44709

[21] Appl. No.: 733,334

[22] Filed: Oct. 18, 1976

[51] Int. Cl.² ............................................. B23B 51/04
[52] U.S. Cl. .................................... 408/206; 144/23; 408/703
[58] Field of Search ............... 408/204, 206, 703, 205, 408/201; 144/23; 125/20

[56] References Cited

U.S. PATENT DOCUMENTS

| 1,855,873 | 4/1932 | Shortell | 408/206 |
| 2,473,077 | 6/1949 | Starbuck, Jr. | 408/206 |
| 2,779,361 | 1/1957 | McKiff | 408/206 |
| 2,852,967 | 9/1958 | Mueller et al. | 408/206 |
| 3,648,508 | 3/1972 | Howgen | 408/204 X |

FOREIGN PATENT DOCUMENTS 19,443  9/1901  United Kingdom ................ 408/204

*Primary Examiner*—Z. R. Bilinsky
*Attorney, Agent, or Firm*—Frease & Bishop

[57] ABSTRACT

An integral hole saw and arbor construction having a one-piece stem formed by a shank, an intermediate drive plate and a reduced neck at the lower end. The reduced neck forms an annular shoulder with the bottom surface of the drive plate. An annular end cap formed with a central hole and an outer annular shoulder, is mounted concentrically on the stem in abutting engagement with the bottom surface and annular shoulder of the drive plate, with the reduced neck extending into the central hole of the end cap. An annular weld extends between the drive plate and end cap to firmly secure and integrally join the end cap on the stem. A cylindrical saw blade is seated in the annular shoulder of the end cap and is firmly secured and integrally joined to the end cap by a second annular weld. A setscrew is threadably mounted on the drive plate for adjustably clamping a pilot drill in an axial bore which is formed in and which extends throughout the stem.

3 Claims, 4 Drawing Figures

INTEGRAL HOLE SAW AND ARBOR CONSTRUCTION

BACKGROUND OF THE INVENTION

1. Field of the Invention

The invention relates to hole saws and arbor constructions for performing high-speed power-driven circular hole sawing operations. More particularly, the invention relates to a construction in which the hole saw and arbor are formed as an integral unit for each particular hole size in order to reduce hole saw tooling costs and the time and effort of assembling a hole saw on a separate arbor.

2. Description of the Prior Art

Most hole saw tooling consists of one or more arbors on which is mounted the desired size of an annular cylindrical hole saw blade. The blade has an end cap with a threaded opening which is engaged with a threaded shank of the arbor or is clamped thereon by a retaining nut mounted on the threaded arbor shank. The arbor also may be provided with a plurality of drive pins which extend through openings formed in the end cap of the saw blade.

There are various hole saw blade types manufactured by different saw blade producers. Usually, each type of hole saw blade requires a particular arbor construction for mounting the saw blade on a drive mechanism. Some interchangeability between various saw blade types and their mounting arbors exists in order to reduce the amount of hole saw components.

One type universal hole saw arbor is described in my U.S. Pat. No. 3,647,310. Such an arbor reduces considerably the amount of hole saw and arbor components required for a hole saw tooling, and permits interchangeability between the components of various manufacturers. Considerable time and effort, however, is still required for assembling hole saws on their arbors each time a change in hole size is required. This joined hole saw and arbor assembly in turn must be mounted on the driving chuck of the power drive mechanism.

Studies have shown that when separate arbors are used, approximately 60% of the cost of a single hole saw blade and arbor is due to the arbor. This cost, however, is reduced where additional hole saw blades are purchased that can be mounted on the same arbor. These studies have shown that approximately 35% of the average hole sawing tool costs incurred by purchases of saw blades and arbors are for the arbors.

The use of separate saw blades removably mounted on an arbor heretofore was desirable to eliminate replacing the arbor and drive stem each time replacement of the saw blade was required because of wear, due to the relatively expensive cost of the arbor in contrast to the cost of the saw blade. This high arbor cost is due to the complicated and sometimes elaborate arbor constructions required for mounting of the various saw blades thereon.

Various prior art hole saws and arbors have been devised which eliminate the use of a threaded arbor shank or retaining clamping nut for mounting of a hole saw blade on the arbor prior to mounting the same on the chuck of a power drive mechanism.

The hole saw of U.S. Pat. No. 2,444,099 eliminates any such threaded clamping nut which engages the threaded shank of an arbor stem for mounting the hole saw thereon by providing a tapered connection between the arbor stem and saw blade. This patent states that the cutting element may be formed integrally with the shank, but indicates that a two-piece construction is preferable and does not disclose any such integral construction. It is believed that it would be difficult for such a tapered connection to be able to transmit the high torques required for many sawing operations without slipping. Furthermore, saw blades similar to that of this construction would be expensive to mass produce.

U.S. Pat. No. 2,800,812 discloses a shell cutter assembly in which a cutting blade is welded to a hollow socket, which combination then is subsequently assembled to the bore of a machine by a plurality of mounting openings. A pilot drill is mounted by a threaded connection within a corresponding threaded bore formed on the cutting blade. Again, such a cutting blade and associated pilot drills would be relatively expensive to mass produce due to the threaded bore and shank for mounting the drill on the cutting blade.

U.S. Pat. No. 3,550,229 shows various hole saw blades and arbor constructions, one of which has the cutting blade formed integrally with a solid tubular stem. Such a construction prevents the use of a pilot drill with the blade which is desirable for most hole saw cutting operations because of such a solid stem construction. Another construction of this patent shows a cutting saw blade having an end cap and setscrew mounted therein for adjustably mounting a pilot drill on the saw blade. Again, such constructions are relatively expensive to mass produce due to the machining and manufacturing procedures required to produce such arbor and blade constructions.

Still another type of known hole saw and arbor construction is shown in U.S. Pat. No. 3,648,508. This construction provides a separate end cap to which a cylindrical hole saw blade is mounted by a tapered drive fit, enabling low cost cylindrical hole saw blades to be used. However, such a construction is not formed as an integral unit, but comprises a plurality of separate components detachably joined together.

Thus, there is a need for an integral hole saw and arbor construction which can be produced economically and yet still provide the necessary hole sawing qualities by integrally joining these inexpensively produced components which enable the arbor to be discarded with the saw blade when the blade becomes worn, and which will eliminate the time consuming assembling of the individual hole saw blades on the arbor prior to mounting the assembly on a power drive mechanism.

SUMMARY OF THE INVENTION

Objectives of the invention include providing an integral hole saw and arbor construction in which the hole saw blade is integrally joined with the arbor and mounting stem to eliminate the usual hole saw tooling constructions in which the hole saw blade is relatively more expensive due to the need for an end cap for mounting the blade on a separate arbor, which then in turn is mounted on the chuck of a power drive means; providing such a construction in which the forming of the arbor and mounting stem integral with the hole saw blade, is only approximately 10% more than the cost of usual hole saw blades having the mounting end caps, and which construction completely eliminates the separate arbors heretofore required, which arbors constitute approximately 35% of the hole saw tooling cost; providing such a construction which eliminates the time and effort of assembling the separate hole saws on the proper size and configuration of arbors, which assembly then in turn must be attached to the chuck of a power drive means; providing such a construction which consists of three main components, namely, a stem, drive plate and cylindrical hole saw blade, in which the stem and drive plate can be mass produced inexpensively by automatic screw machine procedures, and in which the hole saw blade can be mass produced inexpensively by forming a flat strip of high quality steel with teeth milled along one edge to form the cutting edge, which strip then is cut into predetermined sized pieces and rolled into a cylindrical shape and welded along the abutting ends; providing such a contruction in which the stem is a one-piece metal component having an axially extending bore for receiving a pilot drill which is adjustably clamped therein by a setscrew, and in which the pilot drill is formed with a plurality of flat sides on its upper end with at least one of the flat sides extending generally throughout the length of the shank for adjustably clamping the pilot drill in the axial bore; providing such a construction which, when used in combination with such a pilot drill as described above, is adaptable for mounting on various sizes of power drive chucks by clamping either directly to the stem of the arbor or to an extended end of the pilot drill; providing such a construction in which the three main components are joined integrally by a pair of annular welds between the stem and drive plate and between the hole saw blade and drive plate, and in which these welds preferably are tungsten-inert-gas welds which provide sufficient strength for withstanding the high torques exerted on the components during a hole sawing operation; and providing such an integral hole saw and arbor construction which is relatively inexpensive to manufacture, sturdy and durable in use and which eliminates difficulties heretofore encountered, achieves the stated objectives and solves problems and satisfies needs existing in the art.

These objectives and advantages are obtained by the integral hole saw and arbor construction, the general nature of which may be stated as including one-piece stem means formed with a central axial bore and having a shank, an intermediate drive plate and a reduced neck; end cap means formed with an outer annular shoulder and a central opening, with the reduced neck of the stem means being telescopically received within said central opening; a first weld extending between the end cap means and the drive plate integrally joining the end cap means and the stem means; a cylindrical blade having first and second circular ends, with saw teeth being formed on the first end and with the second end being seated in the outer annular shoulder of the end cap means; a second weld extending between the end cap means and the saw blade integrally joining the end cap means and the saw blade; pilot drill means having a plurality of flat surfaces, one of which extends generally throughout the length of the pilot drill, with the pilot drill being mounted within the axial bore of the stem means; and setscrew means threadably mounted on the drive plate means and communicating with the said one flat side of the pilot drill for securing the pilot drill in the axial bore.

BRIEF DESCRIPTION OF THE DRAWING

A preferred embodiment of the invention — illustrative of the best mode in which applicant has contemplated applying the principles — is set forth in the following description and shown in the accompanying drawing, and is particularly and distinctly pointed out and set forth in the appended claims.

Similar numerals refer to similar parts throughout the drawing.

DESCRIPTION OF THE PREFERRED EMBODIMENT

Figure 1:
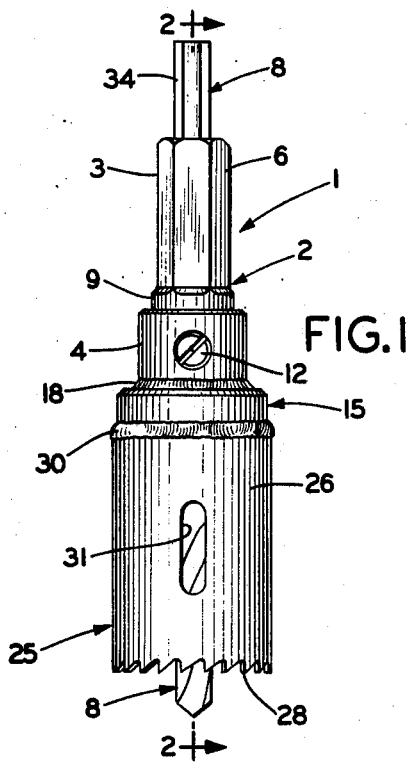
FIG. 1 is an elevational view of the integral hole saw and arbor construction of the invention with a pilot drill mounted thereon.
Figure 2:
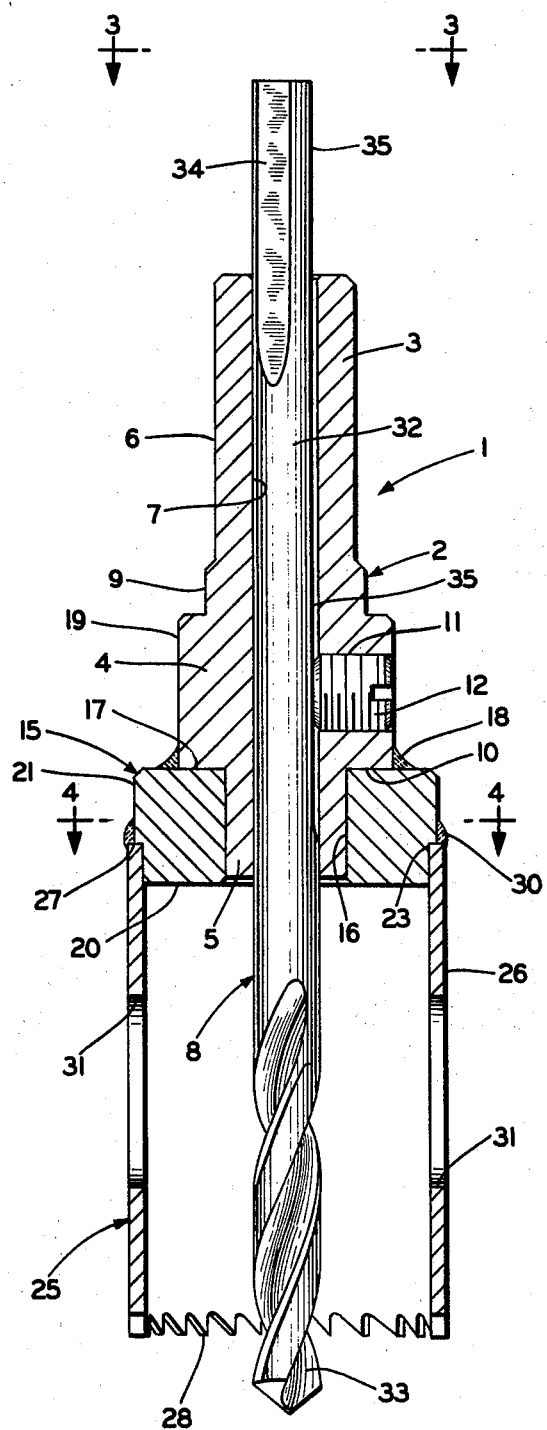
FIG. 2 is an enlarged vertical sectional view taken on line 2—2, of FIG. 1.

The improved integral hole saw and arbor construction is indicated generally at 1, and is shown particularly in FIGS. 1 and 2. Improved construction 1 includes a one-piece metal stem 2 having an upper shank 3, an intermediate drive plate 4 and a reduced neck 5 formed at the lower end thereof.

Figure 3:
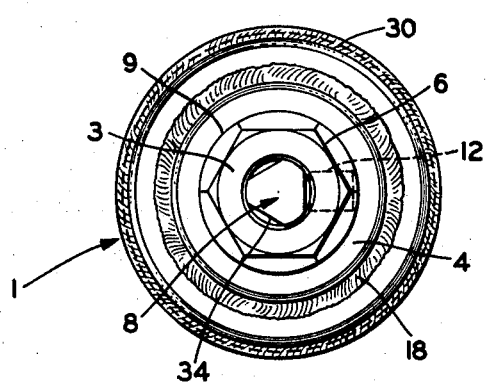
FIG. 3 is a top plan view looking in the direction of Arrows 3—3, FIG. 2.

Shank 3 preferably has a hexagonal cross-sectional configuration with six longitudinally extending flat sides 6 (FIGS. 1 and 3) enabling the shank to be clamped easily by the chuck of a power driving mechanism. A central axial bore 7 extends throughout the length of stem 2 for adjustably receiving a pilot drill 8.

Figure 4:
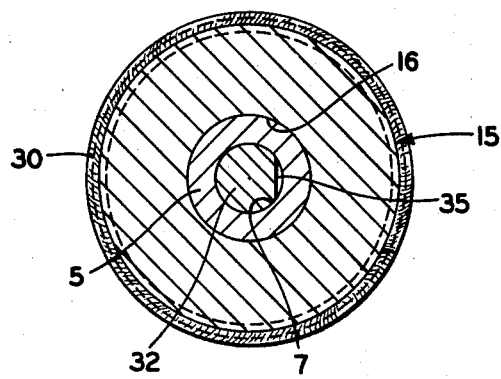
FIG. 4 is a horizontal sectional view taken on line 4—4, FIG. 2.

Drive plate 4 preferably has a circular cross-sectional configuration with a diameter larger than that of stem 2 and merges with shank 3 in an annular, partially tapered portion 9. Reduced neck 5 preferably has a circular cross-sectional configuration (FIG. 4) with a diameter smaller than that of drive plate 4, whereby an annular shoulder 10 is formed at the junction between neck 5 and the bottom surface of drive plate 4.

A threaded opening 11 is formed in drive plate 4, and is normal to and communicates with axial bore 7. A setscrew 12 is mounted in opening 11 and engageable with pilot drill 8 for adjustably clamping the drill within bore 7.

In accordance with one of the main features of the invention, stem 2 is an integral one-piece metal component which can be mass produced at a relatively low cost per piece by automatic screw machine procedures.

A second major component of improved saw and arbor construction 1 is an annular end cap 15. End cap 15 is formed with a cylindrical bore 16, into which neck 3 of stem 2 is telescopically mounted and secured by a press fit. An upper annular end surface 17 of end cap 15 is in abutting relationship with the lower surface of drive plate 4 which forms shoulder 10 with neck 5. End cap 15 is permanently secured to and integrally joined with stem 2 by a weld 18. Weld 18 preferably is annular, extending completely about the junction between end cap 15 and drive plate 4 and between an exposed portion of end surface 17 and the cylindrical side surface 19 of end cap 4 (FIG. 2). It has been discovered through various tests and experiments that a tungsten-inert-gas (TIG) weld has proven most satisfactory for weld 18, and provides a weld able to withstand the large torques and forces exerted thereon with a minimum of failures.

End cap 15 has a second annular lower end surface 20 and a cylindrical outer surface 21. An annular shoulder 23 is formed at the junction of cylindrical surface 21 and lower annular end surface 20. A cylindrical saw blade, indicated generally at 25, is mounted concentrically on and is integrally connected to end cap 15. Saw blade 25 includes a cylindrical side wall 26 which terminates in a circular top edge 27 and a circular bottom edge 28 having saw teeth formed thereon. The upper end of cylindrical wall 26 is seated within annular shoulder 23 of end cap 15 and is secured therein by a second annular weld 30. Weld 30 preferably is formed by a TIG welding operation, as is weld 18, to provide the necessary strength for withstanding the high forces and stresses exerted thereon during hole sawing operations. A plurality of slots 31 are formed in cylindrical saw wall 26 for removing plugs or metal chips upon completion of a hole sawing operation.

Pilot drill 8 includes a cylindrical stem portion 32 and a lower twist grooved portion 33. A plurality of flat surfaces 34 (preferably three in number) are formed on and extend longitudinally along stem 32 with one surface 35 extending generally throughout the entire axial length of stem portion 32. Flat surface 35 is engaged by the inner end of setscrew 12 for clamping drill 8 within bore 7 of stem 2.

The upper end of surface 35, together with the remaining flat surfaces 34 provide a configuration for mounting the hole saw and arbor construction 1 and pilot drill 8 on a power drive means. For example, where the power driving means has a nominal ½ inch chuck, the clamping engagement will be with hexagonal shank 3, and when hole saw and arbor 1 is used with a nominal ¼ inch drive chuck, the clamping engagement will be with flat surfaces 34 and 35 of the extended end of the drill stem. Thus, a firm clamping engagement can be achieved either directly to stem 2 or pilot drill stem 32, enabling the improved hole saw to be used with power drive means having various size clamping chucks. The improved integral hole saw and arbor construction 1 has the advantage of eliminating the need for separate arbors and hole saw blades and eliminates the considerable time and effort required for assembing the various hole saw blades to an arbor each time a different size hole is to be drilled. Construction 1 reduces the total hole sawing tool costs by eliminating the various expensive arbors and separate hole saws heretofore required to provide a full range of hole saw sizes by providing an integral one-piece hole saw and arbor construction which consists of three main components, stem 2, end cap 15 and saw blade 25, all of which can be mass produced and assembled inexpensively. Stem 2 and end cap 15 are automatic screw machine products, with saw blade 25 being produced inexpensively from flat strips of steel having saw teeth formed along one edge. These flat strips then are formed into a cylinder and welded along a longitudinal seam without requiring formation of an integral end wall having a plurality of holes formed therein for mounting on a separate arbor as in prior constructions. Furthermore, in accordance with the invention, these three components are assembled as an integral unit by two inexpensive circular welding operations in forming welds 18 and 30.

Another advantage of the invention is the combination of integral hole saw and arbor construction 1 and pilot drill 8. Flat surfaces 34 and 35 on drill stem 32 permits the combination to be mounted on and used with both the usual ¼ and ½ inch chuck sizes without loss of gripping ability. When used with the ¼ inch chuck size, the torque is transmitted from the power drive means to stem 2 and saw blade 25 through setscrew 12. When used with a ½ inch chuck size, the torque is transmitted directly to saw blade 25 through shank 3 without first transfer by drill 8 and setscrew 12.

Tests also have shown that a tungsten-inert-gas welding procedure for forming weld 18 and 30, as opposed to other known welding procedures, provides the necessary strength for transmitting the torques between the three components of the integrally joined and constructed hole saw and arbor. These TIG welding operations can be carried out with known and relatively inexpensive welding equipment enabling the production cost of the improved hole saw and arbor to be kept at a minimum.

A plurality of the integral hole saw and arbor construction 1 can be produced easily and inexpensively to cover a complete range of usual hole saw sizes ranging generally from 9/16 inch to 6 inches in diameter. Such changes in size can be accomplished easily by changing the diameter or configuration of end cap 15 so that the diameter of annular shoulder 23 matches that of the diameter of cylindrical saw blade 25. The size of stem 2 need not be changed for each incremental increase in saw blade size since the internal diameter of cylindrical bore 16 of end cap 15 can be maintained constant with only the diameter of annular shoulder being changed. Preferably, there will be several sizes of stem 2 for the various sizes of saw blades 25, with each size of stem 2 covering a range of saw blade sizes in order to provide the desired strength for the larger hole saw sizes. This limited number of stem sizes required for the complete range of hole saw sizes reduces considerably production costs and inventory requirement. Likewise, the size and configuration of end caps 15 can remain generally the same with only the diameter of annular shoulder 23 varying for each particular size of hole saw blade 25. Also, the length of the flat strip from which cylindrical blade 25 is formed need only be varied to achieve a change in blade size. Therefore, only a minimum number of components and size changes are required for a complete range of hole saw sizes.

Therefore, improved hole saw and arbor construction 1 provides a construction formed of three components which can be mass produced individually by inexpensive and known procedures and then joined together by simple welding procedures to provide an integral construction which enables a complete range of hole saw sizes to be produced at a cost less than that required for individual hole saw blades and separate arbors; provides a construction which permits a wide range of adjustment of a pilot drill mounted within the arbor and stem, and which enables the improved construction to be mounted on the chuck of a high speed saw drive mechanism, wherein the attaching chucks may cover a range of sizes; provides a new integral hole saw and arbor construction which substantially reduces the cost of performing hole sawing operations by eliminating the changeover time for sawing holes of various sizes, which eliminates the stocking of additional components, which components are subject to loss and misplacement; and provides an improved hole saw and arbor construction which is simple, effective, safe in use, which solves difficulties heretofore encountered in prior constructions, and which achieves objectives and solves problems in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the hole saw and arbor construction is constructed and used, the characteristics of the improved construction, and the advantageous, new and useful results obtained; the new and useful structures, devices, elements, arrangements, parts, and combinations, are set forth in the appended claims.

I claim:

1. Integral hole saw and arbor construction including:
    (a) one-piece stem means having an upper shank, an intermediate drive plate and a lower reduced neck, and formed with a central axial bore extending throughout the length of said stem means;
    (b) end cap means having an annular configuration with a cylindrical side wall terminating in annular upper and lower end surfaces, a central opening extending axially through said end cap means, and an outer annular shoulder formed at the junction of the lower end surface and cylindrical side wall;
    (c) the reduced neck of the stem means being telescopically mounted within the central opening of the end cap means;
    (d) a first weld extending between the upper end surface of the cap and the drive plate integrally joining the end cap means and the stem means;
    (e) a cylindrical saw blade having first and second circular ends, with saw teeth being formed on said first end;
    (f) the second end of the saw blade having a diameter complementary to the diameter of the outer annular shoulder of the end cap means, with said second end of the saw blade being seated within said outer annular shoulder of the end cap means;
    (g) a second weld extending between the cylindrical wall of the end cap means and the saw blade integrally joining the end cap means and the saw blade; and
    (h) setscrew means threadably mounted on the drive plate and communicating with the axial bore whereby a pilot drill may be adjustably clamped within said bore.

2. The construction defined in claim 1 in which a pilot drill is mounted in the axial bore of the stem means; in which the pilot drill includes a stem portion and a twist drill portion with the stem portion being formed with a plurality of longitudinally extending flat surfaces; in which at least one of said flat surfaces has a longitudinal length greater than the axial distance between the setscrew means and top of the upper shank of the stem means; in which the setscrew means engages said one flat stem portion surface to adjustably clamp the pilot drill in the axial bore of the stem means; and in which the length of the pilot drill is greater than the axial distance between the top of the upper shank and saw teeth, whereby the pilot drill may be adjustably mounted by the setscrew means in the axial bore and extend outwardly beyond the top of the upper shank for gripping of the flat surfaces by a chuck of a power drive means.

3. The construction defined in claim 1 in which the upper shank portion of the stem means is hexagonal in cross section.

* * * * *